US010616776B2

(12) United States Patent
Obaidi

(10) Patent No.: US 10,616,776 B2
(45) Date of Patent: Apr. 7, 2020

(54) DYNAMIC PROVISIONING OF A GATEWAY ROLE TO USER DEVICES

(71) Applicant: T-Mobile USA, Inc., Bellevue, WA (US)

(72) Inventor: Ahmad Arash Obaidi, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 95 days.

(21) Appl. No.: 15/282,385

(22) Filed: Sep. 30, 2016

(65) Prior Publication Data
US 2018/0098230 A1 Apr. 5, 2018

(51) Int. Cl.
H04W 24/02 (2009.01)
H04W 28/10 (2009.01)
H04W 4/08 (2009.01)
H04W 84/20 (2009.01)
H04W 4/50 (2018.01)
H04W 4/80 (2018.01)

(52) U.S. Cl.
CPC ............. H04W 24/02 (2013.01); H04W 4/08 (2013.01); H04W 4/50 (2018.02); H04W 28/10 (2013.01); H04W 84/20 (2013.01); H04W 4/80 (2018.02)

(58) Field of Classification Search
CPC .................................................... H04W 24/02
See application file for complete search history.

(56) References Cited

U.S. PATENT DOCUMENTS

| 7,319,715 | B1 | 1/2008 | Souissi et al. |
| 8,112,066 | B2 | 2/2012 | Ayed |
| 8,443,071 | B2 * | 5/2013 | Lu ........................ H04L 12/2807 709/223 |
| 8,566,947 | B1 | 10/2013 | Sankruthi |
| 8,971,803 | B2 | 3/2015 | Dua |
| 9,100,426 | B1 | 8/2015 | Fang |
| 9,125,027 | B2 | 9/2015 | Koenig et al. |
| 9,160,420 | B2 | 10/2015 | Dua |
| 9,606,817 | B1 | 3/2017 | Efstathopoulos |
| 9,674,763 | B2 * | 6/2017 | Mufti .................... H04W 40/02 |
| 10,085,141 | B1 * | 9/2018 | Huang ................... H04W 4/90 |

(Continued)

FOREIGN PATENT DOCUMENTS

| KR | 20130125385 A | 11/2013 |
| WO | 2015172803 A1 | 11/2015 |

OTHER PUBLICATIONS

Audet, F. "The Use of the SIPS URI Scheme in the Session Initiation Protocol (SIP)", Network Working Group, Request for Comments 5630, Standards Track, Oct. 2009, pp. 1-21 and 51.

(Continued)

Primary Examiner — Parth Patel
(74) Attorney, Agent, or Firm — Hans Santos, PLLC

(57) ABSTRACT

A system and method of optimizing a mobile traffic network are provided. A local network group comprising a plurality of user devices is created. One of the plurality of the user devices is selected to act as a gateway for the remaining user devices of the local network group. The selected user device is provisioned to act as a gateway for the local network group. A message is sent to the plurality of user devices of the local network group to route communication through the selected user device via a short range wireless communication technology.

14 Claims, 5 Drawing Sheets

(56) References Cited

U.S. PATENT DOCUMENTS

| | | | | |
|---|---|---|---|---|
| 10,165,614 | B2* | 12/2018 | Ebling | H04W 76/16 |
| 10,223,053 | B2* | 3/2019 | Kim | G06F 3/1275 |
| 2002/0057786 | A1* | 5/2002 | Donovan | H04L 12/4641 |
| | | | | 379/220.01 |
| 2002/0163895 | A1 | 11/2002 | Haller et al. | |
| 2003/0035397 | A1 | 2/2003 | Haller et al. | |
| 2004/0186897 | A1* | 9/2004 | Knauerhase | H04L 67/16 |
| | | | | 709/209 |
| 2004/0249915 | A1 | 12/2004 | Russell | |
| 2005/0213516 | A1 | 9/2005 | Ramirez et al. | |
| 2005/0213590 | A1 | 9/2005 | Hauenstein et al. | |
| 2007/0293197 | A1 | 12/2007 | Ekberg et al. | |
| 2008/0220757 | A1 | 9/2008 | Zeller et al. | |
| 2009/0006503 | A1 | 1/2009 | Bernardi et al. | |
| 2009/0216349 | A1 | 8/2009 | Kwon et al. | |
| 2009/0319613 | A1 | 12/2009 | Hjelm et al. | |
| 2010/0323714 | A1 | 12/2010 | Schmidt et al. | |
| 2011/0047282 | A1* | 2/2011 | Denman | H04L 65/605 |
| | | | | 709/231 |
| 2011/0202418 | A1 | 8/2011 | Kempton et al. | |
| 2011/0320520 | A1 | 12/2011 | Jain | |
| 2012/0198084 | A1* | 8/2012 | Keskitalo | H04L 67/02 |
| | | | | 709/228 |
| 2012/0202428 | A1* | 8/2012 | Mirbaha | H04L 12/185 |
| | | | | 455/41.2 |
| 2014/0085502 | A1 | 3/2014 | Lin et al. | |
| 2014/0150064 | A1 | 5/2014 | Wifvesson et al. | |
| 2014/0248848 | A1* | 9/2014 | Mufti | H04W 76/10 |
| | | | | 455/404.1 |
| 2014/0269425 | A1* | 9/2014 | Fisher | H04L 41/0809 |
| | | | | 370/254 |
| 2014/0269496 | A1* | 9/2014 | Mufti | H04W 40/02 |
| | | | | 370/328 |
| 2014/0328241 | A1 | 11/2014 | Subramanian et al. | |
| 2014/0355446 | A1 | 12/2014 | Altman | |
| 2014/0370895 | A1* | 12/2014 | Pandey | H04W 36/22 |
| | | | | 455/436 |
| 2015/0087325 | A1* | 3/2015 | Nuss | H04W 28/08 |
| | | | | 455/453 |
| 2015/0135283 | A1 | 5/2015 | Tofighbakhsh | |
| 2015/0138952 | A1* | 5/2015 | Tamura | H04L 45/58 |
| | | | | 370/225 |
| 2015/0180730 | A1* | 6/2015 | Felstaine | H04L 41/022 |
| | | | | 709/225 |
| 2015/0195236 | A1 | 7/2015 | Nie et al. | |
| 2015/0208320 | A1 | 7/2015 | Alexander et al. | |
| 2015/0223252 | A1* | 8/2015 | Yan | H04W 24/08 |
| | | | | 455/452.1 |
| 2015/0281939 | A1 | 10/2015 | Li et al. | |
| 2015/0282077 | A1 | 10/2015 | Yavuz et al. | |
| 2015/0326448 | A1* | 11/2015 | Chaudhary | G06Q 20/14 |
| | | | | 705/40 |
| 2015/0333979 | A1* | 11/2015 | Schwengler | H04L 41/5054 |
| | | | | 709/226 |
| 2015/0350947 | A1 | 12/2015 | Khayrallah | |
| 2015/0365217 | A1 | 12/2015 | Scholten et al. | |
| 2016/0021238 | A1 | 1/2016 | Abramson et al. | |
| 2016/0037569 | A1 | 2/2016 | Kim et al. | |
| 2016/0323161 | A1 | 11/2016 | Laffaye et al. | |
| 2016/0330140 | A1* | 11/2016 | Cook | H04L 12/4641 |
| 2017/0052806 | A1* | 2/2017 | Akiyoshi | G06F 9/485 |
| 2017/0063598 | A1* | 3/2017 | Zhu | H04L 41/5041 |
| 2017/0164417 | A1 | 6/2017 | Kress et al. | |
| 2017/0206044 | A1* | 7/2017 | Kim | H04N 1/00474 |
| 2017/0257229 | A1* | 9/2017 | Fisher | H04L 41/0809 |
| 2017/0318479 | A1* | 11/2017 | Cotanis | H04W 24/02 |
| 2017/0353556 | A1* | 12/2017 | Seenappa | H04L 67/12 |
| 2018/0013211 | A1* | 1/2018 | Ricci | H01Q 21/30 |
| 2018/0097775 | A1* | 4/2018 | Obaidi | H04L 63/0236 |
| 2018/0352488 | A1* | 12/2018 | Selvaganapathy | H04W 48/16 |

OTHER PUBLICATIONS

Bappalige, S.P., "An Introduction to Apache Hadoop", Opensource. com, retrieved on Dec. 20, 2016 from <<https://opensource.com/life/14/8/intro-apache-hadoop-big-data>>, 16 pages.

Cisco NFV Solution: Enabling Rapid Service Innovation in the Era of Virtualization. White Paper [online]. Sisco, 2014. Retrieved from the Internet: <URL: https://www.cisco.com/c/dam/global/shared/assets/pdf/sp04/nfv-solution.pdf>. See p. 1, lines 12-13: and p. 6, line 12.

International Search Report and Written Opinion for PCT Application No. PCT/2017/054200, dated Jan. 30, 2018, 12 pages.

International Search Report and Written Opinion for PCT Application No. PCT/US2017/054199 dated Jan. 11, 2018, 14 pages.

Non-Final Office Action for U.S. Appl. No. 15/282,297, dated Apr. 6, 2018, 25 pages.

A Final Office Action for U.S. Appl. No. 15/135,081, dated Jan. 16, 2018, 19 pages.

A Notice of Allowance for U.S. Appl. No. 15/135,081, dated Jun. 7, 2018, 23 pages.

Office Action for U.S. Appl. No. 15/135,081, dated Jun. 14, 2017, 18 pages.

"Fault Tolerant Computer System", Wikipedia, retrieved Jan. 25, 2017 from <<https://en.wikipedia.org/wiki/Fault-tolerant_computer system>>, 5 pages.

Hamlin, K., "A Study on SETI@home Distributed Network", Department of Computer Science, Wichita State University, retrieved Dec. 20, 2016 from <<http://www.cs.wichita.edu/~chang/lecture/cs843/project/paper/kh-stei.pdf >>, 11 pages.

"Hot Spare", Wikipedia, retrieved Jan. 25, 2017 from <<https://en.wikipedia.org/wiki/Hot_spare>>, 3 pages.

Jennings, et al., "Managing Client-Initiated Connections in the Session Initiation Protocol (SIP)", Network Working Group, Request for Comments 5626, Standards Track, Oct. 2009; retrieved from <<https://tools.ietf.org/html/rfc5626>> pp. 1-4, 6-18, 21-25, and 44-45.

Kallenberg, C. et al, "Setup for Failure: Defeating Secure Boot", The Mitre Corporation, Mar. 6, 2014, retrieved from <<https://infocon.org/cons/SyScan/SyScan%202014%20Singapore/SyScan%202014%20presentations/SyScan2014_CoreyKallenberg_SetupforFailureDefeatingSecureBoot_WP.pdf>>, 4 pages.

"MyTAM—Intercede", retrieved Jan. 25, 2017 from <<https://www.intercede.com/products-mytam>>, 9 pages.

Proudler, G., "What's in a Trusted Computing Platform?", InformIt, Aug. 23, 2002, retrieved from <<http://www.informit.com/articles/printerfriendly/28804>>, 5 pages.

Regenscheid, A., "Roots of Trust in Mobile Devices", ISPAB, Feb. 2012, retrieved from <<http://csrc.nist.gov/groups/SMA/ispab/documents/minutes/2012-02/feb1_mobility-roots-of-trust_regenscheid.pdf>>, 5 pages.

"Security Enhancements in Android 4.3", Android Open Source Project, retrieved Jan. 25, 2017, from <<https://source.android.com/security/enhancements/enhancements43.html>>, 2 pages.

"Trust Zone—Arm Developer", retrieved Jan. 25, 2017 from <<https://developer.arm.com/technologies/trustzone>>, 9 pages.

"Trusted Execution Environment", Wikipedia, retrieved Jan. 25, 2017 from <<https://en.wikipedia.org/wiki/Trusted_execution_environment>>, 7 pages.

"Trusted Execution Technology", Wikipedia, retrieved Jan. 25, 2017 from <<https://en.wikipedia.org/wiki/Trusted_Execution_Technology>>, 4 pages.

"Trusted Platform Module", Wikipedia, retrieved Jan. 25, 2017 from <<https://en.wikipedia.org/wiki/Trusted_Plafform_Module>>, 10 pages.

The Non-Final Office Action for U.S. Appl. No. 15/386,563 dated Nov. 16, 2018, 67 pages.

U.S. Appl. No. 15/386,563, Notice of Allowance dated Mar. 8, 2019, 20 pages.

* cited by examiner

DYNAMIC PROVISIONING OF A GATEWAY ROLE TO USER DEVICES

BACKGROUND

In recent years, wireless communications have become increasingly popular. Mobile devices are used to make voice calls, check email and text messages, update social media pages, stream media, browse websites, and so forth. In addition, the internet of things (IoT) may include a network of user devices, vehicles, buildings, etc., that have embedded therein various electronics, software, sensors, actuators, and network connectivity that enable these devices, collectively referred to herein as user devices, to collect and exchange data via wireless communication.

In at least one estimate, wireless data traffic has grown 4,000 fold over the past 10 years. As a result, users expect their user devices to provide many functions, including reliably working on a mobile communication network to receive constant and dependable telecommunication and data communication services. The rapid proliferation of wireless networks, mobile computing applications, and IoT's has put additional demands on mobile communication networks. Cell towers that provide access to a mobile traffic network, may be over-burdened the member of user devices that are attempting to communicate via the cell towers simultaneously. As the number of user devices that can communicate over the mobile communication network increases, network operators attempt to find new ways of optimizing channel distribution and other network resources to accommodate the increasing demand.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

This disclosure generally relates to wireless networks, and more particularly, to optimizing wireless networks by dynamically assigning network roles to user devices. A central server creates a local network group comprising a plurality of user devices. One of the plurality of user devices is selected to act as a gateway for the remaining user devices of the local network group. The selected user device is provisioned by the central server to act as a gateway for the local network group. The user devices of the local network group route communication through the selected user device via a short range wireless communication technology, which may thereby reduce the probability of dropped calls, disburden the mobile traffic network, and reduce power consumption on the user devices. The techniques described herein may be implemented in a number of ways. Example implementations are provided below with reference to the following figures.

Example Network Architecture

Figure 1:
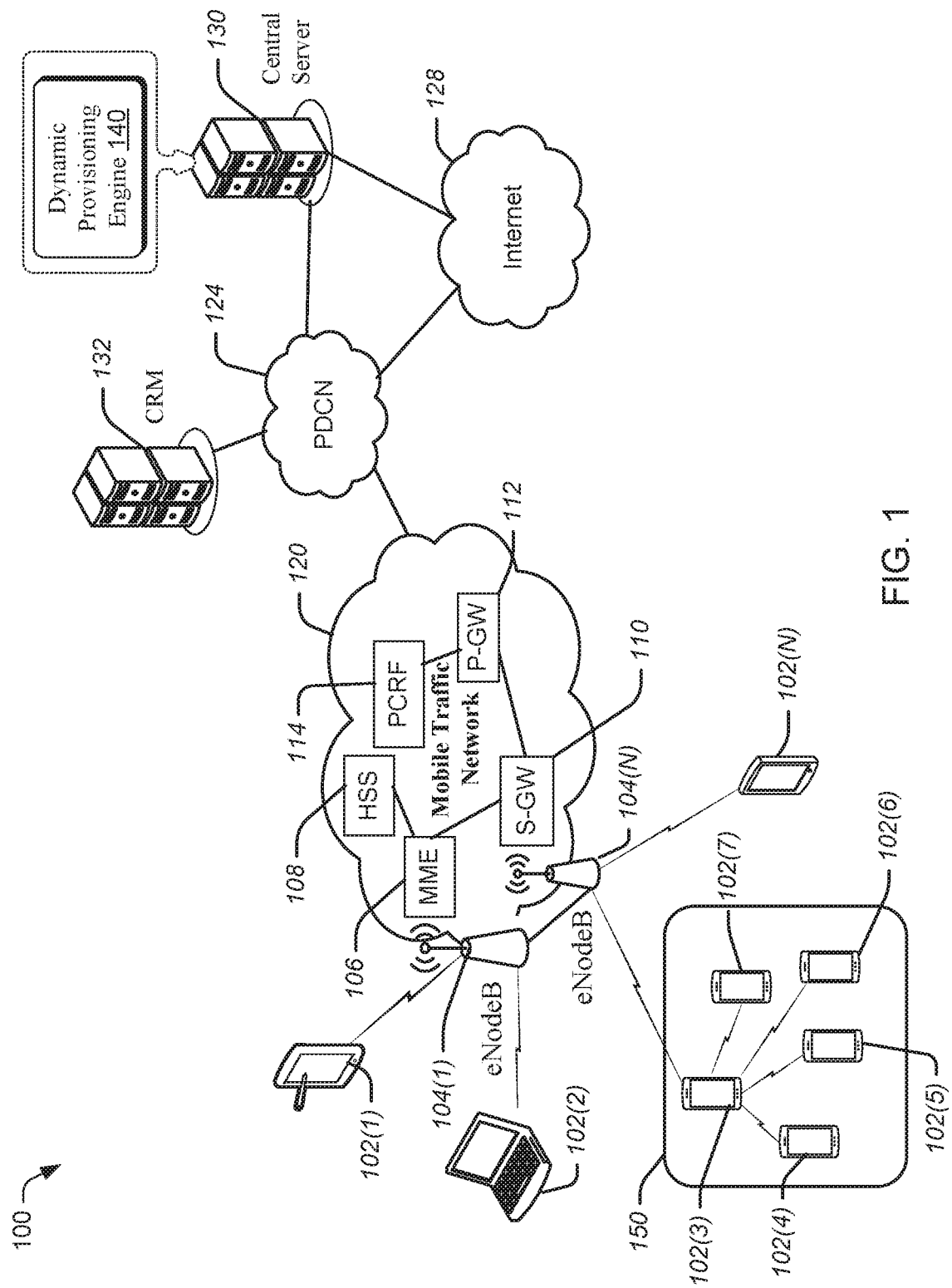
FIG. 1 illustrates an example architecture for implementing a wireless network optimization system to provide a dynamic provisioning of a gateway role to a user device.

FIG. 1 illustrates an example architecture for implementing a wireless network optimization system configured to provide a dynamic provisioning of a gateway role to a user device. FIG. 1 illustrates a mobile communication network 100 as may be operated by a mobile communication network carrier or service provider to provide a wide range of mobile communication services and ancillary services or features to its subscriber customers and associated mobile device users. Many of the elements generally indicated by the reference numeral 100 are elements of the mobile communication network and are operated by or on behalf of the carrier. The mobile communication network 100 provides communications between various user devices (User devices), such as User devices 102(1) to 102(n), as well as communications for the UDs with networks and stations outside the mobile communication network 100.

For purposes of later discussion, several User devices appear in the drawing, to represent some examples of the devices that may receive various services via the mobile traffic network 120. Today, User devices typically take the form of portable handsets, smart-phones, tablet computers, personal digital assistants (PDAs), and smart watches, although they may be implemented in other form factors, including consumer, sensor, and business electronic devices, sometimes referred to as IoT's.

The mobile communication network 100 provides communication for User devices 102(1) to 102(n), as well as for mobile devices that do not participate in the dynamic provisioning of a gateway role described herein. Mobile communication network 100 allows users of the user devices (e.g., customers or subscribers to the mobile traffic network 120) to initiate communication, and receive information from the packet data communication network (PDCN) 124.

The mobile communication network 100 typically is implemented by a number of interconnected networks. Hence, the overall mobile communication network 100 may include a number of Mobile traffic networks (RANs) 120, as well as regional ground networks interconnecting a number of RANs and a wide area network (WAN) interconnecting the regional ground networks to core network elements, such as the Multimedia Messaging Service Centers (MMSCs). A regional portion of the mobile communication network 100, such as that serving User devices 102(1) to 102(n) may include one or more RANs (represented by the mobile traffic network 120) and a regional circuit and/or packet switched network and associated signaling network facilities.

Physical elements of a mobile traffic network 120, operated by one of the mobile service providers or carriers, include a number of base stations, represented in the example of FIG. 1 by eNodeB 104(1) and 104(n) nodes. Such eNodeB 104(1) to 104(n) nodes may include a base transceiver system (BTS) that communicates via an antennae system at the site of the node and over the air-link with one or more of the user devices (102(1) to 102(n)) when the user devices are within range. Each eNodeB 104 node may include a BTS coupled to several antennae mounted on a radio tower within a coverage area (e.g., geolocation) often referred to as a "cell." The BTS is the part of the radio network that sends and receives RE signals to/from the user devices that the eNodeB node 104 currently serves.

The mobile traffic network 120 carries the user communications for the user devices between the respective eNodeB 104 nodes and other elements with or through which the user devices communicate. Some individual elements such as switches and/or routers forming the mobile traffic network 120 are omitted here for simplicity. It will be understood that the various network elements can communicate with each other, as well as other elements of the mobile traffic network 120, and other networks (e.g., the public switched telephone network (not shown) and the Internet 128) either directly or indirectly.

By way of illustrative example only and not limitation, the mobile traffic network 120 includes elements of the Evolved Packet Core (EPC) and the Evolved Universal Mobile Telecommunications System (UMTS) Terrestrial Access Network (E-UTRAN) and the access network E-UTRAN. For simplicity, classical UMTS architecture elements, such as the UTRAN, are not displayed, while it will be understood that such architectures are supported as well by the teachings herein.

The Mobility Management Entity (MME) 106 is the control node that processes the signaling between the user devices 102(1) to 102(n) and the mobile traffic network 120. The Home Subscriber Server (HSS) 108 includes the user device users' subscription data, such as the Evolved Packet System (EPS) subscribed quality of service (QOS) profile and access restrictions for roaming.

The serving gateway (S-GW) serves as the local mobility anchor for data bearers when a user device moves between eNodeB's (e.g., from eNodeB 104(1) to 104(n)). It also retains the information about the bearers when the UE is in the idle state and may temporarily buffer downlink data while the MME 106 initiates paging of the user device to reestablish the bearers. In addition, the S-GW performs some administrative functions in the mobile traffic network 120 such as collecting information for charging against an account of a UD. For example, the volume of data routed to or from a user device (e.g., 102(4)) over a user device (e.g., 102(3)) that is provisioned to operate as a gateway may be calculated, such that an account of the provisioned user device (e.g., 102(3)) is not charged for the communication for the user device (e.g., 102(4)). The provisioning of a user device is discussed in more detail later. The MME 106 also may serve as the mobility anchor for interworking with other 3GPP technologies such as general packet radio service (GPRS) and UMTS.

The Packet Data Network Gateway (P-GW) 112 is responsible for IP address allocation for the UD, as well as QoS enforcement and flow-based charging according to rules from the policy charging rules function (PCRF) 114. It may filter the downlink user IP packets into the different QoS-based bearers. This is performed based on Traffic Flow Templates (TFTs). The P-GW performs QoS enforcement for guaranteed data rate (GBR) bearers. It should be noted that while a single gateway 112 is illustrated in FIG. 1 for simplicity, different types of gateway servers may be used for different wireless technologies. For example, a high availability (HA) server can be used for 3G; a P-GW server for 4G; general packet radio service core network (GGSN) for 2G, 3G, and wideband code division multiple access (WCDMA); etc. The different types of gateway servers are sometimes collectively referred to herein as gateway server 112.

The Policy Control and Charging Rules Function (PCRF) 114 is responsible for policy control decision-making, as well as for controlling the flow-based charging functionalities in the Policy Control Enforcement Function (PCEF), which is in the P-GW 112.

The service provider of the mobile traffic network 120 may also operate a number of systems that provide ancillary functions in support of the communications services and/or application services provided through the mobile traffic network 120, and those elements communicate with other nodes or elements of the mobile traffic network 120, such as one or more private IP type packet data networks based on a packet data communication network (PDCN) 124, sometimes referred to as an Intranet a private network). Generally, such systems are part of, or connected for, communication via the PDCN 124 and may provide additional services such as providing a dynamic provisioning of gateway roles to user devices 102(1) to 102(n) over the mobile traffic network 120.

In the example of FIG. 1, there is a central server 130 that is configured to communicate with the user devices 102(1) to 102(n) the PDCN 124 and the mobile traffic network 120. The central server 130 can also communicate over the Internet 128. In one embodiment, the central server 130 has a dynamic provisioning engine 140 (e.g., a software program stored in its memory) to perform various control functions. In various embodiments, the functions of the dynamic provisioning engine 140 may include determining what user devices (e.g., 102(1) to 102(n)) can communicate via a wireless local area network (WLAN), a wireless personal area network (WPAN), or a wireless sensor actor network (WSAN), collectively referred to herein as short range wireless communication technology. For example, user devices 102(3) to 102(7) may communicate with each other, without limitation, over Digital Enhanced Cordless Telecommunications (DECT), Near Field Communication (NFC), ZigBee, Bluetooth, ultra-wideband (UWB), wireless USB, or the like. One advantage of using short range wireless communication technology is that it typically uses less power than direct communication with a base station (e.g., 104(N)).

The dynamic provisioning engine 140 of the central server 130 may create a local network group 150 based on the user devices that are within the scope of short range wireless communication of each other. For example, upon the dynamic provisioning engine 140 determining that user devices 102(3) to 102(7) can communicate with each other over a short range wireless communication technology, the dynamic provisioning engine may regard these user devices 102(3) to 102(7) as a local network group 150 that may be used to enhance and/or make more efficient the services of the mobile traffic network 120. To that end, the dynamic provisioning engine 140 may select one of the plurality of user devices 102(3) to 102(7) to act as a gateway for the remaining user devices. For example, user device 102(3) may be provisioned by the dynamic provisioning engine 140 to be used as a gateway. Put differently, the hardware of the user device 102(3) is used to implement the functionality of a networking device that forwards data packets between the local network group 150 and the mobile traffic network 120. Instead of using a separate communication channel between each user device and the base station 104(N), which may burden the mobile traffic network 120, the user device 102(3) is used as a gateway for the remaining the user devices in the local network group 150. Thus, a single communication channel between the local network group 150 (i.e., via the used device 102(3) provisioned as a gateway) can accommodate the many user devices 102(3) to 102(N) in the local network group 150. In one embodiment, the user device that is provisioned to act as a gateway (e.g., 102(3)) also performs the function of gateway for the same user device 102(3). The criteria and process for identifying one or more user devices to be provisioned as a switch are discussed in more detail later.

The dynamic provisioning engine 140 of the central server 130 may also instruct the remaining user devices (e.g., 102(4) to 104(7)) to communicate over a short range technology. For example, instead of establishing a communication channel directly with a base station 104(N), each of the remaining user devices 102(4) to 102(7) communicates via short range technology with the user device 102(3) that is provisioned as a gateway. In this way, a single communication channel suffices for all user devices 102(3) to 102(7) in the local network group to communicate over the mobile traffic network 120. In one embodiment, not all user devices in the local network group 150 need to subscribe to the mobile traffic network 120. For example, one or more devices in the local network group 150 may be part of other mobile traffic network(s)—not shown. However, these user devices may still subscribe to the services discussed herein.

In one embodiment, there is a customer relationship management (CRM) server 132 that offers its account holders (e.g., a user of a UD) on-line access to a variety of functions related to the account holders' account, such as on-line payment information, subscription changes, password control, and the like, in one embodiment, the CRM identifies whether a user device associated with an account of a user is subscribed to the dynamic provisioning of gateway roles discussed herein. The CRM server 132 may provide the user an interface via the Internet 128 to access the account information. Hence, a user's terminal, such as personal computer (PC), may be used to access on-line information about an account of a UD, which the carrier of the mobile traffic network 120 makes available via the carrier's web site, accessible through the Internet 128. In various embodiments, the CRM 132 identifies which user device is responsible for a communication using the mobile traffic network 120 via the provisioned gateway, such that the provisioned gateway is not charged for a routed communication. In one embodiment, the functionality of the CRM server 132 may be created on the core network via the HSS 108 and PCRF 114, along with a billing server.

For example, if user device 102(6) uses the mobile traffic network 120, it may communicate using short range wireless communication technology with the user device 102(3), which is provisioned as a gateway. The user device 102(3) may provide its own identification information and that of user device 102(6) to the mobile traffic network 120, such that the CRM 132 can bill the appropriate user device for the communication. In one embodiment, the CRM 132 offers bonuses to accounts of user devices that are provisioned as gateways.

By virtue of using the dynamic provisioning of the network function described herein, the network congestion with respect to the base station 104(N) is reduced. Further, the probability of dropped calls is reduced because there are fewer user devices competing for the resources of the mobile traffic network 120 via the base station 102(N). Further, power consumption for the user devices participating in this service may be reduced because communication via short range wireless communication typically uses a fraction of the power consumed via a direct channel to the base station 104(N) of the mobile traffic network 120. Accordingly, the quality of the service provided to subscribed user devices is improved while the mobile communication network does not have to make a substantial hardware investment; rather, the resources of subscribed user devices are used.

While the central server 130 and the CRM server 132 are illustrated by way of example as separate servers, they may be implemented on various hardware platform combinations. Thus, the functionality described herein with respect to each of the servers 130 and 132 can also be provided by one or multiple different computing devices. In other words, the central server 130 and the CRM 132 need not be a stand-alone computing devices but can be combined in various configurations. In one embodiment, the central server 130 and/or the CRM server 132 may have a scalable and fault-tolerant architecture, such as that provided by a cloud.

Example User Device Components

Figure 2:
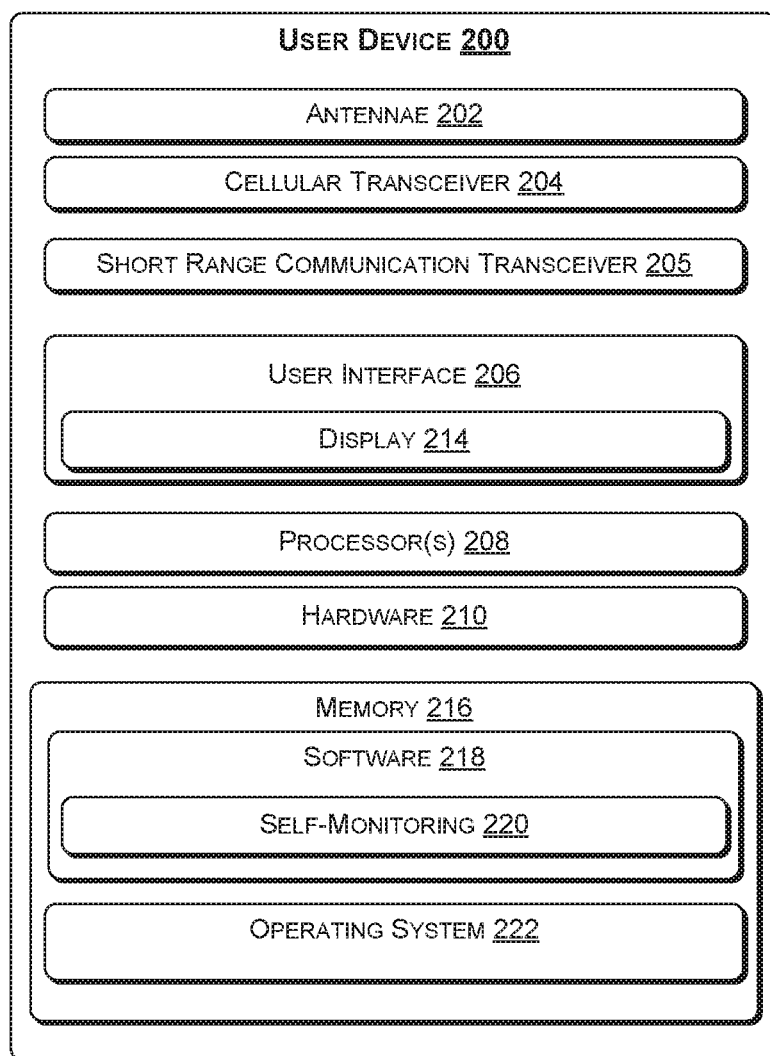
FIG. 2 is a block diagram showing various components of an illustrative user device.

As discussed in the context of FIG. 1, the dynamic provisioning of gateway roles discussed herein involves an interaction with appropriately configured user devices. To that end, it may be useful to consider the functional elements/aspects of an exemplary user device, at a high-level. For purposes of such a discussion, FIG. 2 provides a block diagram illustration of an exemplary user device 200. It will be understood that the user device 200 may be a handset type mobile phone or may be incorporated into another device, such as a personal digital assistant (PDA), a tablet computer, an IoT device, or the like. For discussion purposes, the illustration shows the user device 200 in the form of a handheld smart-phone.

The user device 200 may include one or more antennae 202, a cellular transceiver 204, one or more short range wireless communication transceiver(s) 205, user interface 206, one or more processors 208, hardware 210, and memory 216. In some embodiments, the antennae 202 include an uplink antenna that sends radio signals to a base station, sometimes referred to herein as an eNodeB or base station (e.g., 104(1) in FIG. 1), and a downlink antenna that receives radio signals from the radio tower. In other embodiments, a single antenna may both send and receive radio signals. These signals may be processed by the cellular transceiver 204, which is configured to receive and transmit digital data. The one or more short range wireless communication transceivers 205 may support various short range wireless communication technologies, such as WLAN, WPAN, WSAN, etc.

The user device 200 may include a user interface 206 that enables a user to provide input and receive output from the user device 200. For example, the user interface 206 may include a data output device (e.g., visual display 214, audio speakers, haptic device, etc.,) that may be used to display whether a user device is being provisioned as a gateway, is part of a local network group to conserve the user device and/or mobile traffic network 120 resources, or is operated in normal de (e.g., outside a dynamic provisioning function). The user interface 206 may also include one or more data input devices. The data input devices may include, but are not limited to, combinations of one or more of keypads, keyboards, mouse devices, touch screens, microphones, speech recognition packages, and any other suitable devices or other electronic/software selection interfaces that may be used to communicate over the mobile traffic network 120.

The user device 200 may include one or more processors 208, which may be a single-core processor, a multi-core processor, a complex instruction set computing (CISC) processor, or another type of processor. The hardware may include a power source and digital signal processors (DSPs), which may include single-core or multiple-core processors. The processors may perform operation in parallel to process a stream of data that may be provided over the mobile traffic network 120.

The hardware 210 may also include network processors that manage high speed communication interfaces, including communication interfaces that interact with peripheral components. The network processors and the peripheral components may be linked by switching fabric. The hardware may further include hardware decoders and encoders, a network interface controller, and/or a universal serial bus (USB) controller. The network interface controller may enable the processors to transmit and receive data via the mobile traffic network 120 of FIG. 1. In some embodiments, the hardware may also include a direct memory access (DMA) engine. The DMA engine may enable the various controllers to access the memory 216 independently of the one or more processors 208 to perform tasks. The various controllers and processors of the user device 200 may execute instructions and perform tasks under the direction of software components that are stored in the memory 216.

The memory 216 may be implemented using computer-readable media, such as computer storage media. Storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), high definition video storage disks, or other optical storage, magnetic cassettes, magnetic tape, magnetic disk storage or other magnetic storage devices, or any other non-transmission medium that can be used to store information for access by a computing device.

The memory 216 may store various software components that are executable or accessible by the processor(s) 208 and controller(s) of the user device 200. The various components of the memory 216 may include software 218 and an operating system 222. Each software module may include routines, program instructions, objects, and/or data structures that perform particular tasks or implement particular abstract data types. For example, the software 218 of the memory 216 may include a self-monitoring application 220 that is operative to receive and follow instructions from the dynamic provisioning engine 140 of the central server 130 of FIG. 1. These instructions may include for the user device 200 to be provisioned as a gateway for a local network group of user devices 150, to route communication intended for the mobile traffic network 120 to a user device (e.g., 102(3)) that has been provisioned as a gateway, and/or to solicit a status update to the dynamic provisioning engine 140.

Accordingly, the self-monitoring application 220 is configured to evaluate various parameters of the corresponding user device 200 to provide these parameters in the form of a status of the user device 200 to the provisioning engine 140. For example, the self-monitoring application 220 may identify the available processing power and the processing load the processor(s) 208. In one embodiment, even if the user device 200 has a large inherent processing power, a low available processing capability may be reported if there are many processes presently running that are slowing down the user device 200. Similarly, other parameters, such as the available memory 216, signal strength of the cellular transceiver 204 (and/or the short range wireless communication transceiver(s) 205), and the present power supply situation are identified. For example, the user device 200 may be running off a battery in the hardware 210. In this regard, the available percentage of battery power remaining may be identified. If the user device 200 is connected to an uninterrupted power supply, then this information may be reported in the status report.

The self-monitoring application 220 may also determine what other user devices are in a short range wireless communication technology range. To that end, the self-monitoring application of each participating user device may cooperate to provide their identification information and signal strength. The identification information may include the international mobile station equipment identity (IMEI), mobile identification number (MIN), mobile equipment identifier (MEID), or the like.

In various embodiments, the foregoing parameters together with the identification information of the user device 220 (and other user devices the present user device 220 is in scope of short range wireless communication with) are reported to the dynamic provisioning engine 140 of the central server 130 by the self-monitoring application 220 in a status data. The status data may be provided at predetermined intervals, upon a trigger event, or upon request from the central server. A trigger event may be a change in status of the user device, such as a reduction in available processing power due to a larger load on the processor(s) 208, dropping below a predetermined power threshold (e.g., 20%), being out of range from a present base station or from the local network group 150, to initiate a handover, etc. Upon receipt of the status data, the dynamic provisioning engine 140 assigns a score to the user device 200. A handover (e.g., reassignment) of the role of a gateway to another user device and scoring are discussed in more detail later.

The operating system 222 may include components that enable the user device 200 to receive and transmit data via various interfaces (e.g., user controls, communication interface, and/or memory input/output devices), as well as process data using the processors 204 to generate output. The operating system 222 may include a presentation component that presents the output (e.g., display the data on an electronic display 214 of the user device 200, store the data in memory 216, transmit the data to another user device (e.g., via a short range wireless communication technology), etc.). Additionally, the operating system 222 may include other components that perform various additional functions generally associated with an operating system.

Example Use Case

Figure 3:
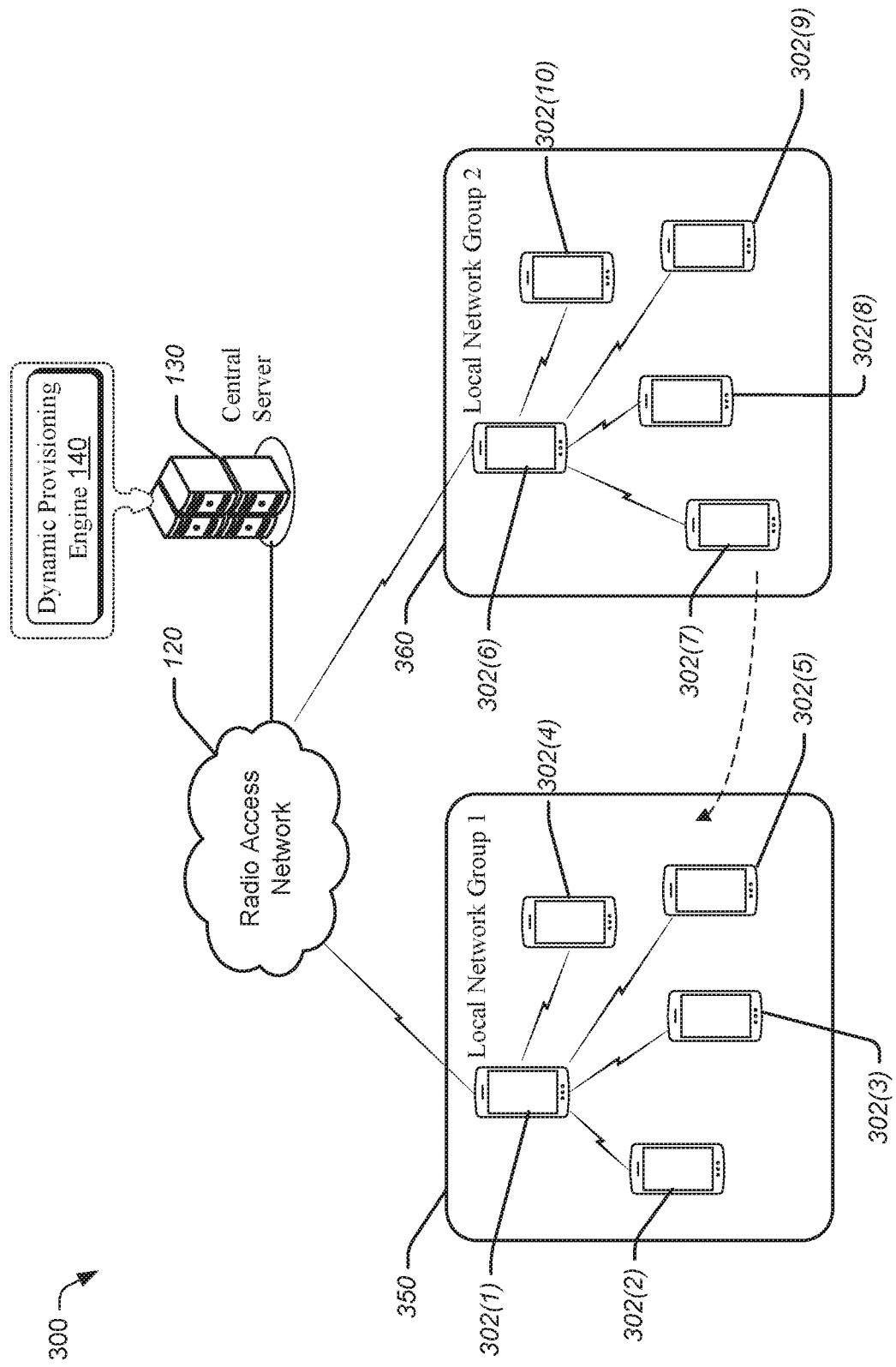
FIG. 3 illustrates an example scenario where an embodiment of a dynamic provisioning of a gateway role is used.

With the foregoing overview of an example architecture for implementing a wireless network optimization system of FIG. 1 and a block diagram illustration of an exemplary user device of FIG. 2, it may be helpful to provide an example use case. To that end, FIG. 3 illustrates an example scenario where user devices are dynamically provisioned the role of a gateway. Consider, for example, a sporting event at a stadium or a large office building with multiple floors. There may be many user devices (represented by user devices 302(1) to 302(1)) that are configured to communicate over one or more mobile traffic networks, such as mobile traffic network 120. Thus, many user devices in a common geo-location may be simultaneously competing with the resources of the mobile traffic network 120 for communication services. Such burden on the mobile traffic network 120 may result in a lower quality of communication, such as dropped calls or difficulty accessing the mobile traffic network 120.

Consider now that each of the user devices 302(1) to 302(10) depicted in system 300 is subscribed to the dynamic provisioning of gateway role service discussed herein. To that end, each of the user devices 302(1) to 302(10) has a self-monitoring application stored in its memory that is configured to report its status to the central server 130 over the mobile traffic network 120 at predetermined intervals, upon request, or upon a trigger event. In one embodiment, the status of each user device in its local network group is based on one or more of the following parameters: (i) an available processing power of the user device; (ii) an available memory of the user device; (iii) a signal strength to the base station (e.g., to the mobile traffic network 120) of the user device; (iv) an available supply power of the user device; and (v) a short range technology capability of the user device. A score may be assigned to each parameter based on a magnitude of each parameter, respectively.

For example, a user device with more available processing power receives a higher score than one that has a slower CPU, has fewer CPU cores, or is identified to be slowed down by multiple processes. Similarly, a unit with more available memory receives a higher score than one that has less available memory. For each user device 302(1) to 302(10), a total score, referred to herein as a competence score, is calculated by the dynamic provisioning engine 140 by summing the scores of all parameters for each user device, respectively. In one embodiment, each parameter is weighted based on the significance of the parameter. Thus, the sum may reflect a weighted total score. These status reports and scores may be stored in a memory of the central server 130.

Upon determining that there is a concentration of user devices in a geolocation (e.g., the event stadium), the dynamic provisioning engine 140 of the central server 130 may create two separate local network groups 350 and 360 based on the user devices that are within a scope of short range wireless communication of each other. Each of these local network groups 350 and 360 may be used to enhance and/or make more efficient the services of the mobile traffic network 120 for their particular local network group. In one embodiment, if a user device may qualify (e.g., 302(5)) to be in either local network group 350 or 360 due to being able to communicate in short range wireless communication technology with both local network groups 350 and 360, in various embodiments, such user device (e.g., 302(5)) is included in the group based on (i) proximity (e.g., via GPS coordinates) to the other user devices, or (ii) load leveling the number of user devices associated with a provisioned gateway.

The dynamic provisioning engine 140 may select one of the plurality of user devices 102(3) to 102(7) that has the highest competence score in its local network group (e.g., user device 302(1) in local network group 350, and user device 302(6) in local network group 360) to act as a gateway for its respective local network group in this regard, the dynamic provisioning engine may provision the user device 302(1) to act as a gateway for the first local network group 350 and provision the user device 302(6) to act as a gateway for the second local network group 360. For example, a message may be sent to the self-monitoring application of the user device 302(1) to perform a virtualized network function (VNF) of the gateway for the first local network group 350. Thus, network functions are implemented in a virtualized manner on the user device 302(1), which is used as a commodity computing hardware. Put differently, the function of the gateway functionally is attributed to a selected user device 302(1)). Similar action is performed on user device 302(6) for the second local network group 360.

For each local network group 350 and 360, the remaining user devices (i.e., 302(2) to 302(5) for local network group 350, and 302(7) to 302(10) for local network group 2) are instructed by the dynamic provisioning engine 140 to route communication through the selected user device (302(1) and 302(6), respectively) via a short range wireless communication technology.

Consider now that the user device 302(7) is moved from one area to another. In this regard, the self-monitoring app of the user device 302(7) sends a notification to the dynamic provisioning engine 140. Upon determining that the user device 302(7) is now in scope of short range wireless communication to the first local network group 350, the user device 302(7) is assigned to the first local network group 350. Accordingly, traffic from the user device 302(7) may continue via the virtual gateway performed by user device 302(1).

In one scenario, user device 302(6), which has been provisioned in this example as a gateway for the second local network group 360, may experience a trigger event. For example, user device 302(6) may move out of scope of short range wireless communication from one or more user devices 302(7) to 302(10), have a reduction in available processing power, go below a predetermined battery power threshold (e.g., 20%), etc., collectively referred to herein as a failure of the provisioned user device. Upon the dynamic provisioning engine 140 learning of the new status failure) of the user device 302(6) from the self-monitoring application of the user device 302(6), the provisioning engine 140 may perform a handover operation by provisioning the functionality of the gateway to another user device that has the present highest competence score in the local network group (i.e., second local network group 360 in this example).

Example Call Flow Process

Figure 4:
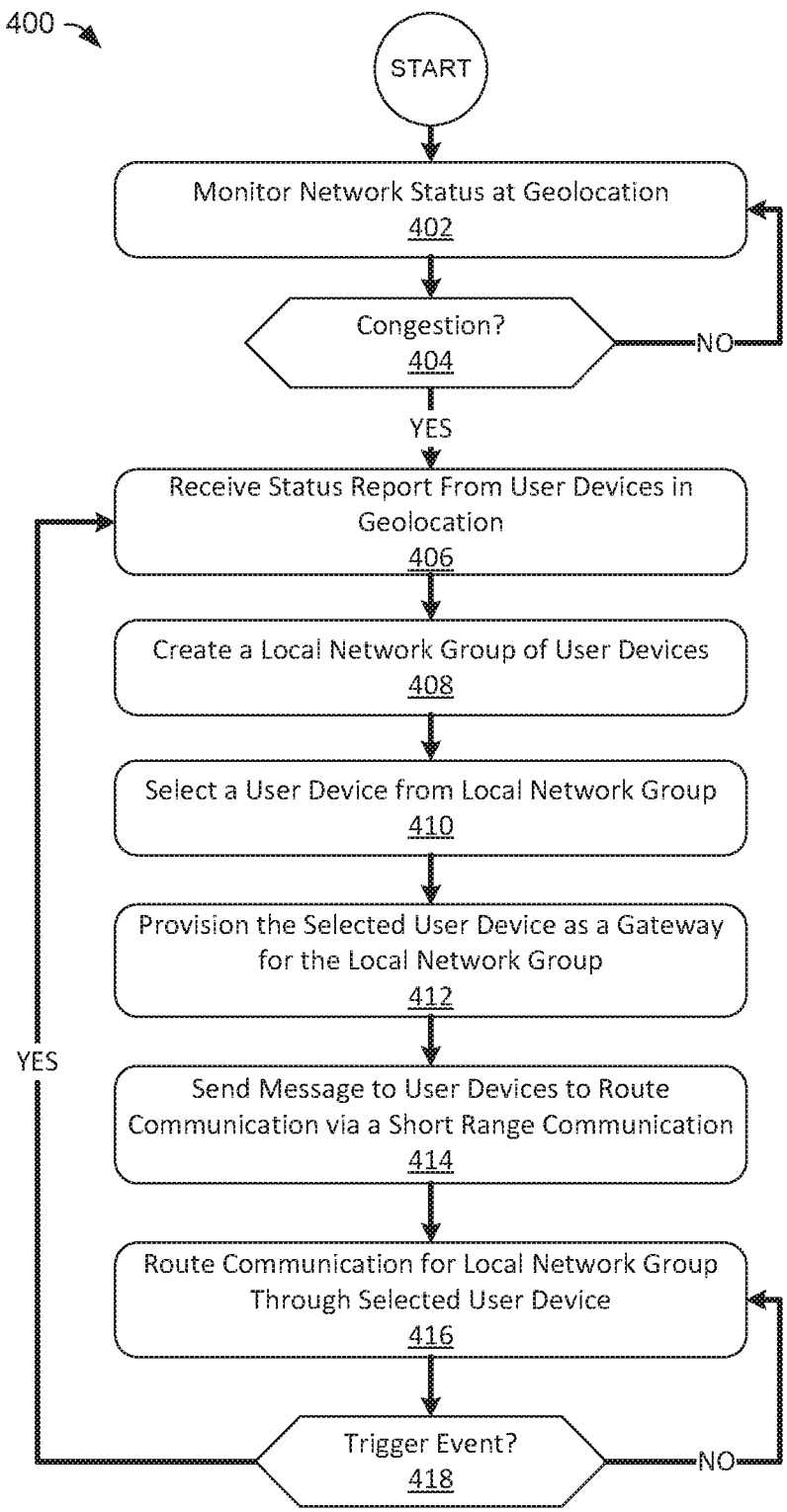
FIG. 4 presents an illustrative process for dynamically provisioning a gateway function to a user device.

With the foregoing overview of the mobile communication network 100, the various components of an example user device 200, and the example use case 300, it may be helpful now to consider a high-level discussion of an example call flow process. To that end, FIG. 4 presents an illustrative process 400 for dynamically provisioning a gateway function to a user device. The process 400 is illustrated as a logical flow, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the process 400 is described with reference to the architecture of the mobile communication network 100 of FIG. 1 and the user device of FIG. 2.

At block 402, the dynamic provisioning engine 140 of the central server 130 monitors the network status for one or more geolocations. In one embodiment, each geolocation is associated with a particular base station (e.g., 104(1) to 104(N)).

At block 404, the dynamic provisioning engine 140 determines whether there is network congestion at a geolocation. Congestion may be regarded as operation beyond predetermined network thresholds, such as a more than usual member of user devices communicating via the mobile traffic network 120 at a geolocation. Upon determining that there is no congestion (i.e., "NO" at decision block 404), the process continues with the monitoring mode of block 402. However, upon determining that there is congestion (i.e., "YES" at decision block 404), the process continues with block 406.

At block 406, the dynamic provisioning engine 140 receives status reports from user devices in the geolocation. As discussed previously, in various embodiments, a self-monitoring application of each user device that participates in the provisioning service discussed herein may send various parameters together with the identification information of the user device (and other user devices a user device is in scope of short range wireless communication with) to the dynamic provisioning engine 140, in the form of a status data. Such status report may be received at predetermined intervals, upon a trigger event, or upon request from the dynamic provisioning engine 140. In the example of process 400, it is assumed that the status report is requested by the dynamic provisioning engine 140.

At block 408, the dynamic provisioning engine 140 creates a local network group of user devices 260 based on the user devices that are within a scope of short range wireless communication of each other, (e.g., 102(3) to 102(7)).

At block 410, the dynamic provisioning engine 140 selects a user device (e.g., 102(3)) from the plurally of user devices 102(3) to 102(7) that has the highest competence score in its local network to implement the functionality of a gateway. In some embodiments, if the number of user devices in the local network group 150 is above a predetermined threshold, then additional user devices (i.e., the ones having the highest competence score(s)) are selected.

At block 412, the dynamic provisioning engine 140 provisions the user device 102(3) to act as a gateway for the local network group 150. To that end, a message is sent to the self-monitoring application of the user device 102(3) to perform a VNF of a gateway for the local network group 150.

At block 414, the dynamic provisioning engine 140 instructs the user devices in the local network group 150 to (e.g., instead of using a cellular transceiver to communicate over the mobile traffic network 120) route all communication via a short range wireless communication technology to the provisioned gateway. In various embodiments, this instruction may be received by each user device 102(3) to 102(7) in the local network group 150 directly via a direct connection between a base station (e.g., 104(N)) and the corresponding user device or relayed by the selected user device 102(3) to the remaining user devices (102(4) to 102(7)) via short range wireless communication.

Consequently, at block 416, all communication of the local network group 150 is routed through the selected user device 102(3), which performs the functionality of a gateway for the local network group 150.

User devices 102(3) to 102(7) of the local network group 150 may change their status over time. In this regard, at block 418, the dynamic provisioning engine evaluates whether a trigger event occurs. For example, user 102(3), which has been provisioned as a gateway, may move out of scope of short range wireless communication from one or more user devices in the local network group 150, have a reduction in available processing power, go below a predetermined battery power threshold (e.g., 20%), a user of the user device 102(3) may turn OFF the dynamic provisioning feature, etc. Upon the dynamic provisioning engine 140 learning of the new status of the user device 102(3) from the self-monitoring application of the user device 102(3) or not receiving communication from the user device 102(3) for a predetermined period (i.e., "YES" at decision block 418), the provisioning engine 140 may continue with block 406, which may ultimately lead to a handover operation. However, if there is no trigger event (i.e., "NO" at decision block 418), the process continues with block 416, where communication continues to be routed through the selected user device 102(3).

Example Computer Platform

Figure 5:
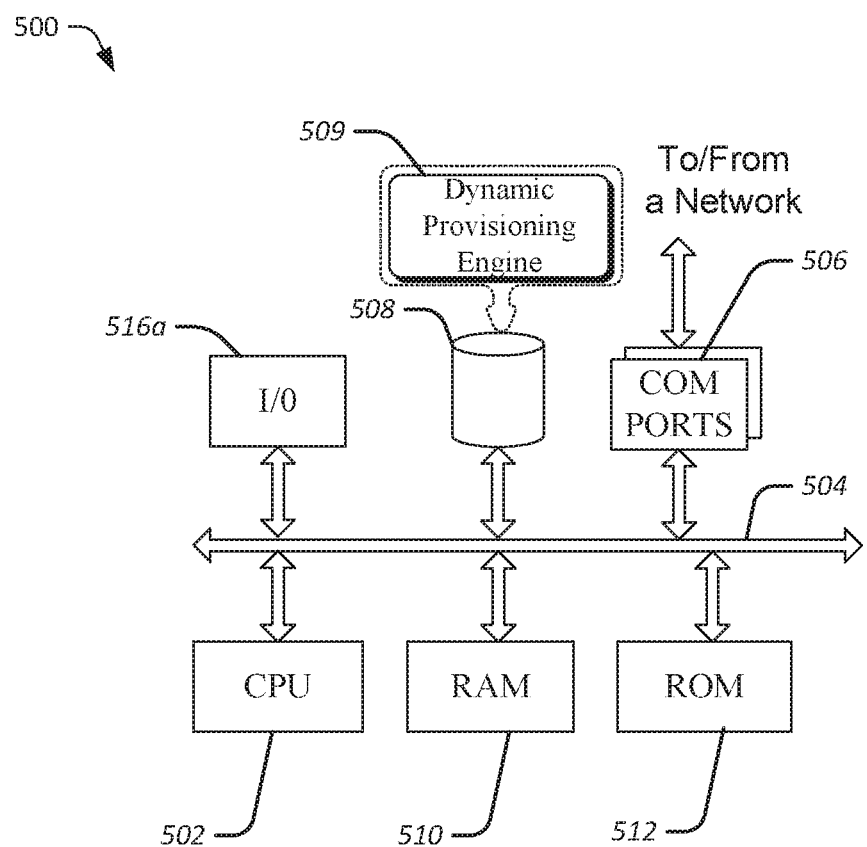
FIG. 5 provides a functional block diagram illustration of a computer hardware platform that may be used to implement a dynamic provisioning of a gateway role to a user device.

As discussed above, functions relating to providing a dynamic provisioning of a gateway to user devices over a wireless network can be performed on one or more computing devices connected for data communication, as shown in FIG. 1 and in accordance with the example process 400 of FIG. 4. An exemplary computing device in the form of a user device 102 has been discussed above with respect to FIG. 2. FIG. 5 provides a functional block diagram illustration of a computer hardware platform. In particular, FIG. 5 illustrates a network or host computer platform 500, as may be used to implement a server, such as the central server 130.

A computer configured as a server, for example, includes a data communication interface 506 for packet data communication. The server computer may include an I/O interface 516 that may include a display, a touch screen, a keyboard, a pointing device, a microphone, a loudspeaker, and/or any other type of user interface device. The server computer also includes a central processing unit (CPU) 502, in the form of one or more processors, for executing program instructions. The server platform may include an internal communication bus 504, program storage 508, and data storage for various data files to be processed and/or communicated by the server, although the server may receive programming and data via network communications. Data can be stored in various forms of computer-readable media, including (but not limited to) hard disk 508, random access memory (RAM) 510, read only memory (ROM) 512, and the like. The central server has a dynamic provisioning engine 509 stored in its memory, represented by way of example only and not limitation, as hard disk 508.

The hardware elements, operating systems and programming languages of such servers are conventional in nature. In one embodiment, the server functions may be implemented in a distributed fashion on a number of similar platforms, to distribute the processing load. In one embodiment, the functionality of the server discussed herein may be combined in one or more server platforms. For example, the functions of the CRM 132 and the central server 130 may be performed on the same server (e.g., central server 130). In one embodiment, the platform 500 may have a scalable and fault-tolerant architecture, such as that provided by the cloud.

The software functionalities discussed herein involve programming, including executable code as well as associated stored data, e.g., files used for applications on the central server 130, such as the dynamic provisioning engine 509, as discussed herein.

The software code is executable by the corresponding computing device. In operation, the code is stored within the computing device. At other times, however, the software may be stored at other locations and/or transported for loading into the appropriate computing device system.

Execution of such code by a processor of the computing device enables the computing device to perform the provisioning of the gateway function to a user device as described herein. Hence, aspects of the methods of optimizing the performance of the mobile traffic network as outlined above may be embodied in programming. Program aspects of the technology may be thought of as "products" or "articles of manufacture" typically in the form of executable code and/or associated data that is carried on or embodied in a type of non-transitory machine readable medium.

Conclusion

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

It is understood that the dynamic provisioning of a gateway functionality on a user device is performed upon subscriber approval.

It is understood that any specific order or hierarchy of steps in the process disclosed in FIG. 4 are illustrations of exemplary approaches. Based upon design preferences, it is understood that the specific order or hierarchy of steps in the processes may be rearranged, expanded, and some steps omitted. Some of the blocks may be performed simultaneously. For example, the action of receiving status reports from user devices in a geolocation may be performed continuously, at predetermined intervals, upon request from the dynamic provisioning engine 140, or upon a trigger event.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter,

What is claimed is:

1. A computing device configured to optimize a mobile traffic network, the computing device comprising:
    a processor;
    a network interface communicatively coupled to the processor and configured to enable communications with the mobile traffic network;
    a storage device;
    a provisioning application stored in the storage device, wherein execution of the provisioning application by the processor configures the computing device to perform acts comprising:
        monitoring a network status for a plurality of geolocations, wherein each of the plurality of geolocations are associated with a respective at least one base station of the mobile traffic network;
        determining that there is network congestion at a geolocation of the plurality of geolocations based on the monitoring of the network status; and
        in response to determining that there is network congestion at the geolocation, performing acts including:
            creating a local network group of user devices that are located in the geolocation based on a determination that the user devices are within the scope of short range wireless communication of each other;
            selecting one of the user devices to act as a gateway for communications from the remaining user devices of the local network group to the mobile traffic network;
            provisioning the selected user device to act as the gateway for the communications made from the remaining user devices of the local network group to the mobile traffic network; and
            sending a message to the user devices of the local network group to route communication through the selected user device via a short range wireless communication technology;
        wherein the selection of the user device to act as a gateway is based on:
            receiving, from each user device of the local network group, a data including a status information of the user device, from a self-monitoring application of the user device, respectively:
            determining, for each user device of the local network group, a competence score based on its status information; and
            selecting a user device of the local network group with a highest competence score; and wherein the provisioning of the selected user device to act as a gateway for the local network group comprises: sending a provisioning message to the self-monitoring application of the selected user device to perform a virtualized network function (VNF) of the gateway for the local network group.

2. The computing device of claim 1, wherein the status information of each user device in the local network group is based on the following parameters:
a short range technology capability;
an available processing power of the user device;
an available memory of the user device;
a signal strength to a base station of the mobile traffic network; and
an available supply power of the user device.

3. The computing device of claim 2, wherein execution of the provisioning application further configures the computing device to perform acts comprising: for each user device in the local network group:
assigning a score to each parameter based on a magnitude of each parameter, respectively;
weighting each score based on an importance of each corresponding parameter; and
calculating the competence score by summing the weighted scores of all parameters of the user device.

4. The computing device of claim 1, wherein the creation of the local network group is based on user devices in the geolocation that are within a short range wireless communication technology range of each other.

5. The computing device of claim 4, wherein the short range wireless communication technology is based on at least one of: Digital Enhanced Cordless Telecommunications (DECT), Near Field Communication (NFC), ZigBee, Bluetooth, ultra-wideband (UWB), and wireless USB.

6. The computing device of claim 1, wherein execution of the provisioning application further configures the computing device to perform acts comprising: upon determining that a single user device cannot handle all the user devices in the local network group, selecting a second user device to support the selected user device such that both user devices act as a gateway for the local network group.

7. The computing device of claim 1, wherein the act of sending the message to the user devices of the local network group to route communication through the selected user device via the short range wireless communication technology comprises:
sending the message to the selected user device via a cellular connection using the network interface between the mobile traffic network and the selected user device; and
relaying the message to the remaining user devices in the local network group by the selected user device via the short range wireless communication technology.

8. The computing device of claim 1, wherein the provisioned user device is an internet of things (IoT) device.

9. The computing device of claim 1, wherein execution of the provisioning application further configures the computing device to perform acts comprising: upon determining of a failure of the provisioned selected user device, selecting and provisioning another user device to act as a gateway.

10. A non-transitory computer-readable medium having stored thereon a plurality of sequences of instructions which, when executed by a processor, cause the processor to perform a method of optimizing a mobile traffic network, the method comprising:

monitoring a network status for a plurality of geolocations, wherein each of the plurality of geolocations are associated with a respective at least one base station of the mobile traffic network;
determining that there is network congestion at a geolocation of the plurality of geolocations based on the monitoring of the network status; and
in response to determining that there is network congestion at the geolocation, performing acts including:
creating a local network group of user devices that are located in the geolocation based on a determination that the user devices are within the scope of short range wireless communication of each other;
selecting one of the user devices to act as a gateway for communications from the remaining user devices of the local network group to the mobile traffic network;
provisioning the selected user device to act as the gateway for the communications made from the remaining user devices of the local network group to the mobile traffic network; and
sending a message to the user devices of the local network group to route communication through the selected user device via a short range wireless communication technology;
wherein the selection of the user device to act as a gateway is based on:
receiving, from each user device of the local network group, a data including a status information of the user device, from a self-monitoring application of the user device, respectively:
determining, for each user device of the local network group, a competence score based on its status information; and
selecting a user device of the local network group with a highest competence score; and
wherein the provisioning of the selected user device to act as a gateway for the local network group comprises: sending a provisioning message to the self-monitoring application of the selected user device to perform a virtualized network function (VNF) of the gateway for the local network group.

11. The method of claim 10, wherein the status information of each user device in the local network group is based on the following parameters:
a short range technology capability;
an available processing power of the user device;
an available memory of the user device;
a signal strength to a base station of a mobile traffic network; and
an available supply power of the user device.

12. The method of claim 11, further comprising, for each user device in the local network group:
assigning a score to each parameter based on a magnitude of each parameter, respectively;
weighting each score based on an importance of each corresponding parameter; and
calculating the competence score by summing the weighted scores of all parameters of the user device.

13. The method of claim 10, further comprising: upon determining that a single user device cannot handle all the user devices in the local network group, selecting a second user device to support the selected user device such that both user devices act as a gateway for the local network group.

14. The method of claim 10, wherein sending the message to the user devices of the local network group to route communication through the selected user device via the short range wireless communication technology comprises:
- sending the message to the selected user device via a cellular connection between the mobile traffic network and the selected user device; and
- relaying the message to the remaining user devices in the local network group by the selected user device via the short range wireless communication technology.

* * * * *